United States Patent Office 3,219,680
Patented Nov. 23, 1965

3,219,680
THIOLFLUOROFORMATES AND METHOD FOR THEIR PREPARATION
George Andrew Olah, Sarnia, Ontario, Canada, assignor to The Dow Chemical Company, Midland, Mich., a corporation of Delaware
No Drawing. Filed Aug. 28, 1961, Ser. No. 134,079
11 Claims. (Cl. 260—455)

The present invention relates to a novel class of fluoro compounds and to methods for their preparation. More particularly, the present invention concerns the class of fluoro compounds having the following general formula

RS(O)CF wherein R represents a hydocarbon radical which can have one or more of the hydrogen atoms replaced with halogen atoms. The new compounds have been tested and found to be useful as insecticides when applied to the habitat of the insect as an ingredient in an aqueous spray composition. Further the compounds have been found to be useful intermediates in the preparation of fluoro hydrocarbons in the manner of my copending application Serial No. 134,126, filed even date herewith.

The novel compounds can be conveniently prepared by reacting a thiolchloroformate having the formula RS(O)CCl wherein R has the aforesaid significance, with anhydrous hydrogen fluoride. The reaction mixture is cooled to about −20° to about 20° C. during the mixing of the reactants then permitted to slowly warm to room temperature. The mixing and warming steps are accompanied by stirring. The warming step is usually controlled to provide a reaction time below room temperature of about two hours. After the reaction mixture has reached room temperature the stirring is continued for about another two hours. During this period a major part of the unreacted hydrogen fluoride distills over and can be collected, condensed and recycled to subsequent reactions. Upon completion of the room temperature distillation, the reaction mixture was washed with ice water, and the organic layer which forms separated, dried with anhydrous sodium sulfate, and, finally fractionated under vacuum to recover the hydrocarbon thiolfluoroformate.

It is to be understood that while the procedure above set forth is the preferred procedure variations can be made in reaction conditions such as temperature and time of reaction without departing from the spirit of the invention. Thus, if the reaction is carried out under superatmospheric pressures, the temperature of reaction and of the subsequent distillation can be increased appropriately as well as a reduced reaction period.

Hydrocarbon thiolchloroformates which can be employed in accordance with the present invention are those alkyl and aryl thiolchloroformates and their halogenated analogs having the general formula RS(O)CCl Some of such alkyl thiolchloroformate compounds are methyl, ethyl, propyl, butyl, pentyl, dodecyl, pentadecyl thiolchloroformates and the like as well as their isomers such as isopropyl tertiary butyl and the like and their halogenated derivatives such as chloropropyl, dichlorobutyl, bromopropyl and the like. Thus, one can employ substantially any alkyl thiolchloroformate having from 1 to 20 or more carbon atoms in the alkyl chain as well as their chloro, bromo, fluoro and iodo derivatives. Further, one can employ the aryl and alkylaryl thiolchloroformates and their halogenated derivatives, as for example, phenylthiolchloroformate, p-chlorophenylthiolchloroformate, p-fluorophenylthiolchloroformate, methylphenylthiolchloroformate and the like.

The following example illustrates the present invention but are not to be construed as limiting.

*Example*

One mole of a compound having the formula RS(O)CCl was cooled to about −20° C. and 5.0 moles of anhydrous hydrogen fluoride was condensed into the RS(O)CCl with stirring. Upon completion of the addition of the hydrogen fluoride, the reaction mixture was continuously stirred and permitted to slowly warm up to room temperature, over a two-hour period. During this period the unreacted hydrogen fluoride distilled over, was condensed and collected for use in subsequent reactions. The reaction mixture was washed with ice water, the organic layer which formed separated, dried with anhydrous sodium sulfate and fractionally distilled under vacuum. The following table records the reactants and yields of products obtained following the above procedures.

$$RSC(O)\ Cl + HF \rightarrow RSC(O)F + HCl$$
$$(I) \qquad\qquad (II)$$

| R | B.P., ° C. (II) | Percent Yield* (II) |
|---|---|---|
| $CH_3$ | 78–80 | 89 |
| $C_2H_5$ | 104–5 | 91 |
| n-$C_3H_7$ | 133–5 | 90 |
| i-$C_3H_7$ | 100–2 | 86 |
| $C_4H_9$ | 165–7 | 93 |
| $C_6H_5$ | 65/7 mm. Hg | 94 |
| p-$C_6H_4Cl$ | 93–5/6 mm. Hg | 90 |
| p-$C_6H_4F$ | 66–8/7 mm. Hg | 93 |

*Based on halogen exchange.

The compounds of the present invention have been tested and found to be useful as the active ingredients in compositions which are employed to control insects. In representative operations an aqueous solution of phenylthiolchloroformate containing 500 parts of the active ingredient per million parts of ultimate composition was sprayed on the habitat of two spotted spider mite to the point of run off. As a result of these operations there was obtained a 90% kill of the insect in a single application.

I claim:
1. A compound having the formula

RSC(O)F wherein R represents a member selected from the group consisting of alkyl, haloalkyl, phenyl, halophenyl, alkyl phenyl radicals having from 1 to 20 carbon atoms in the alkyl moiety.
2. Methylthiolfluoroformate.
3. Ethylthiolfluoroformate.
4. n-Propylthiolfluoroformate.
5. Iso-propylthiolfluoroformate.
6. n-Butylthiolfluoroformate.
7. n-Dodecylthiolfluoroformate.
8. Phenylthiolfluoroformate.
9. p-Chlorophenylthiolfluoroformate.

10. p-Fluorophenylthiolfluoroformate.

11. A method for preparing an organic thiolfluoroformate which comprises reacting anhydrous hydrogen fluoride in the liquid form with an organic thiolchloroformate selected from the group consisting of alkyl, haloalkyl, phenyl, alkylphenyl and halophenyl thiolchloroformates having 1 to 20 carbon atoms in the alkyl moiety at a temperature of from about −20° to about +20° C., and separating the so-formed thiolfluoroformate.

References Cited by the Examiner

UNITED STATES PATENTS 2,820,807  1/1958  Man _____ 260—455

FOREIGN PATENTS 480,105  2/1938  Great Britain.

OTHER REFERENCES

Kollonitsch et al.: Chem. Ber., volume 89, 2288–92 (1956).

Nakanishi et al.: J. Am. Chem. Soc., volume 77, 3099–3100 (1955).

Yarovenko et al.: Zhur. Obshchei Khimii, volume 29, 3792–6 (1959).

CHARLES B. PARKER, *Primary Examiner.*

DANIEL D. HORWITZ, *Examiner.*